United States Patent [19]

Michaelis

[11] Patent Number: 4,516,231
[45] Date of Patent: May 7, 1985

[54] OPTICAL DISC SYSTEM HAVING MOMENTUM COMPENSATION

[75] Inventor: Theodore D. Michaelis, Medford, N.J.

[73] Assignee: RCA Corporation, New York, N.Y.

[21] Appl. No.: 411,973

[22] Filed: Aug. 26, 1982

[51] Int. Cl.³ .................... G11B 7/12; G11B 21/00
[52] U.S. Cl. ......................... 369/44; 369/111; 369/43; 369/45; 369/247; 369/251; 350/255
[58] Field of Search ............ 369/111, 43, 45, 44, 369/197, 198, 246, 247, 251, 266; 350/255

[56] References Cited

U.S. PATENT DOCUMENTS

| 891,778 | 6/1908 | Mertens. | |
|---|---|---|---|
| 2,679,192 | 5/1954 | Seeley et al. | |
| 2,850,286 | 9/1958 | Dolphin | 369/198 |
| 3,830,505 | 8/1974 | Robinow | 369/43 |
| 4,088,057 | 5/1978 | Nasypany | 89/1.701 |
| 4,097,895 | 6/1978 | Spong | 358/128 |
| 4,100,576 | 7/1978 | Ditthardt | 369/111 |
| 4,101,008 | 7/1978 | Frosch | 350/255 |
| 4,102,536 | 7/1978 | Clinis | 369/43 |
| 4,160,270 | 7/1979 | Goldschmidt et al. | 358/128 |
| 4,165,519 | 8/1979 | Goto | 358/128 |
| 4,387,452 | 6/1983 | Bricot | 369/45 |
| 4,433,410 | 2/1984 | Siryj | 369/291 |

OTHER PUBLICATIONS

U.S. patent application Ser. No. 393,605 (Siryj) filed Jun. 30, 1982.

*Primary Examiner*—Alan Faber
*Attorney, Agent, or Firm*—Joseph S. Tripoli; Robert L. Troike; Christopher Lyle Maginniss

[57] ABSTRACT

The focus actuator, turntable and translation stage in an optical disc record/playback system may effect relatively large reaction forces on the components of the system. These reaction forces can cause vibrations which interfere with or distort information recording or retrieving operations which occur at the same time that high speed access is being effected. A momentum compensating mass is coupled to the focus actuator, turntable and other moving elements to reduce or eliminate the reaction forces which can affect system operation.

12 Claims, 7 Drawing Figures

OPTICAL DISC SYSTEM HAVING MOMENTUM COMPENSATION

The Government has rights in this invention pursuant to a Government Contract.

The present invention relates to record disc systems for use in recording and retrieving information from a disc record and, more particularly, to a system for recording and retrieving information wherein the system has momentum compensation for reducing vibrations induced by reaction forces effected by motion in the system.

BACKGROUND OF THE INVENTION

High density optical recording systems which may be used for recording and playing back information are known in the prior art. For example, in U.S. Pat. No. 4,097,895, entitled, "MULTI-LAYER OPTICAL RECORD" issued to F. W. Spong, on June 27, 1978, an optical disc record/playback system is described wherein data is recorded in the form of pits in an absorbtive coating on the surface of an optical disc. The pits are formed by focusing a high intensity light beam on the surface. In the Spong system, approximately $10^{11}$ bits of information can be stored on one side of a disc-shaped record medium having a 30 cm diameter.

In very high density optical disc systems two turntables, operating independently, may be required to achieve the high data rate continuous operation. In these very high density disc systems, the acceleration and deceleration during fast access may cause interfering vibrations. For example, fast spinup requirements of one turntable may impose a large reaction torque on the frame of the structure which is transmitted via the frame to another turntable or translation stage containing tracking and focus apparatus which is operating simultaneously. In general, this reaction torque may cause loss of track or focus on the working turntable, i.e., the induced vibrations in the working turntable or its associated equipment may adversely affect the system operation. Further, the translational stage which is used in radially positioning the optical head of an optical disc recorder/player may effect vibration in the system. In certain applications, e.g., wherein several optical heads associated with a single disc are independently controlled in time and space, a problem may exist whereby one of the optical heads and its associated translational stage which is undergoing high acceleration or deceleration in achieving fast access disturbs another optical head or its associated translational stage while reading or writing on the same or on another disc. Large inertial forces transmitted via the frame of the system may disturb the reading optical head. Furthermore, the focus actuator in one optical head may impose relatively large reaction forces on the translation stage upon which it is mounted or on an optical head. Due to the compliance of the translational stage, linear and rotary vibrations may detract from tracking and focus performance. For example, the linear vibration of the focus actuator housing may couple to the tracking galvanometer, producing rotary vibration of the tracking galvanometer shaft in the presence of the galvanometer rotating assembly unbalance.

SUMMARY OF THE INVENTION

In accordance with the principles of the present invention momentum compensation is provided to reduce the magnitude and frequency spectrum of the reaction torques or forces applied to the frame or other elements of the optical disc system. A momentum compensating mass is introduced between a moving member and the frame of the system to reduce vibrations and their frequency spectrum.

In accordance with one aspect of the present invention an apparatus is provided in a data processing system for reducing vibrations. The data processing system may be used in recording or retrieving information wherein the information is recorded in tracks on the surface of a disc-shaped record medium. The apparatus includes a transducer for recording or retrieving the information in the track. Motion establishing means (e.g., turntable, translational stage, focus actuator, etc.) establishes relative motion between the transducer and the record medium. This motion establishing means causes vibration which adversely affects the recording and retrieving of the information. The vibration occurs when the motion establishing means effects a change in relative motion between the transducer and the record medium such that the relative motion changes from a first value to a second value. Further, the apparatus includes a momentum compensating mass. The momentum compensating mass compensates for the vibration effected by changes in the relative motion. In operation, the momentum compensating mass is reactively coupled to the motion establishing means to reduce the vibrations transmitted through the system.

BRIEF DESCRIPTION OF THE DRAWINGS

Other features and advantages of the invention will be more fully understood from the following detailed description of the preferred embodiment, the appended claims and the accompanying drawing in which:

DESCRIPTION OF THE PREFERRED EMBODIMENTS

Figure 1:
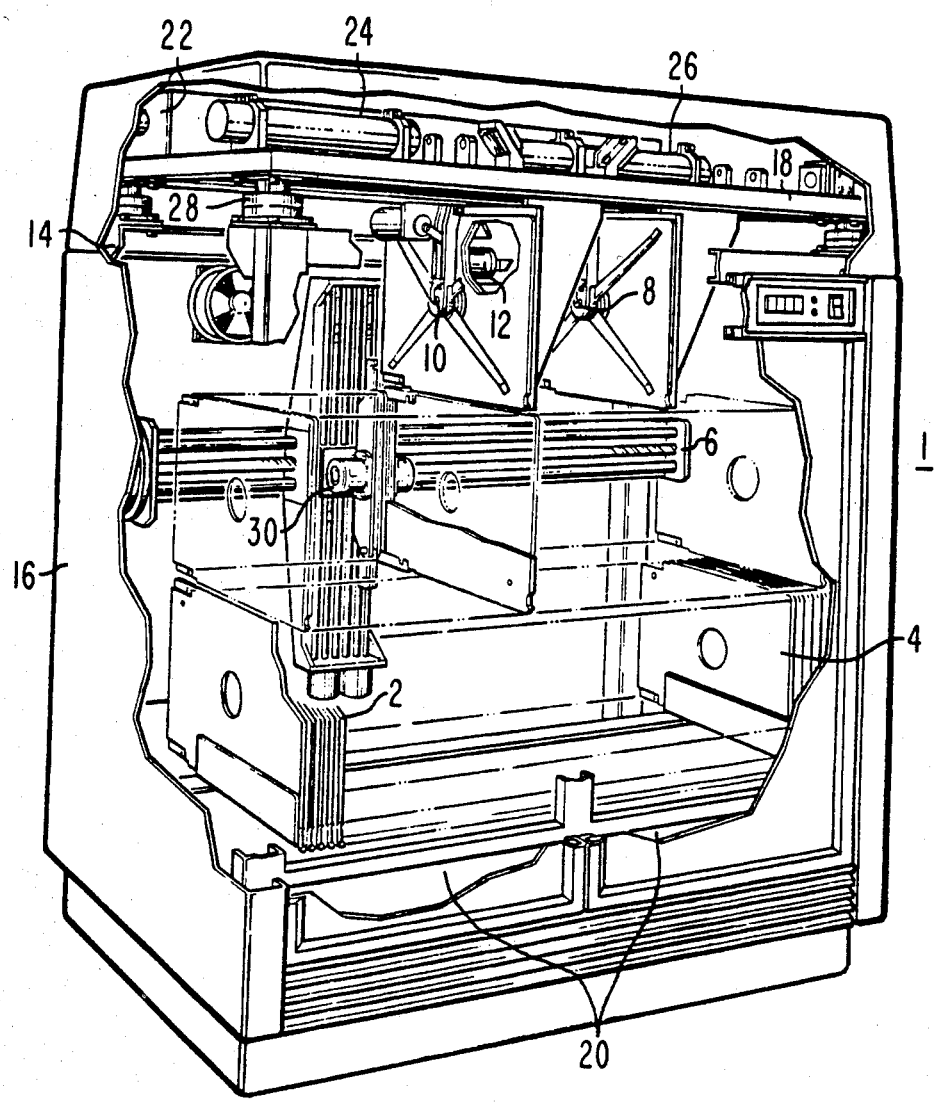
FIG. 1 is a cut-away perspective view of an optical disc player apparatus embodying the principles of the present invention.

Reference will now be made to FIG. 1 which shows an optical disc player/recorder apparatus 1. In the apparatus of FIG. 1, discs are permanently housed in cartridges 2 during the automatic cycling. Illustratively, the discs and cartridges may be of a type described in U.S. Pat. No. 4,433,410, "Protective Cartridge for Optical Discs," issued to B. W. Siryj et al. on Feb. 21, 1984. The player/recorder 1 is a modular design comprising a storage module 4, a transport module 6 and two read/write modules 8 and 10. The player/recorder 1 may be used with single-sided optical discs. Record/play module 10 will record and playback data from a disc with record/playback head 12. Although there are two read/write modules shown in the apparatus of FIG. 1, the system concept is not limited to two read/write modules.

A structural steel assembly 14 provides the framework for the player. Panel 16 encloses the unit. Optical platform 18 is located above read/write modules 8, 10.

Cartridges 2 are stored in the lower part of the unit in the storage module 4. Located below the disc storage module 4 is the electronics compartment 20 which may contain all of the electronics necessary to operate the player/recorder. Located above the disc storage module 4 is the disc transport module 6, which is the mechanism that picks up a cartridge from its stored position and transports it to one of the read/write modules 10 or 8 for record or playback. Following record or playback, transport module 6 returns the cartridge to the storage module.

The optics platform is located above read/write modules 8 and 10. Lasers 22, 24 and 26 and their associated optics are affixed to the optical platform 18. Laser 22 may be a high powered laser (illustratively, a water cooled argon laser) which provides the light beams to read/write stations 8 and 10 for writing data on the disc. Laser 24 and 26 which may be of low power (illustratively, helium neon lasers) provide the light beams to read/write stations 10 and 8, respectively, for reading the data on the disc. The optical platform is mounted by means of vibration isolators 28 to the frame member 14. Suspending the optical platform via the vibration isolators 28 should prevent vibratory motion form the transport module 6 from adversely affecting data during record or playback. Both the cartridge and disc are locked in place during the read/write operation. The disc is locked to a rotating vacuum chuck (illustratively the vacuum chuck is shown in the aforementioned Siryj patent).

Cartridges 2 are stored and retained individually in the cartridge storage module 4. Separate slots retain and space the cartridges along the length of the player. Each cartridge includes a human indentifiable and a machine decodable tag on the outside. At every recorder startup the transport will traverse from one end of the storage module to the other, logging cartridge identifications into memory. The cartridge transport assembly 30 includes one "x" transport and two "y" transports. The two "y" transport approach minimizes disc changing time since it permits the transport to hole one cartridge ready for loading at the read/write station while the cartridge which has just been read or written on is removed. The "x" transport provides transport along the length of apparatus 1 while the one "y" transport moves up and the other "y" transport moves down.

Figure 2:
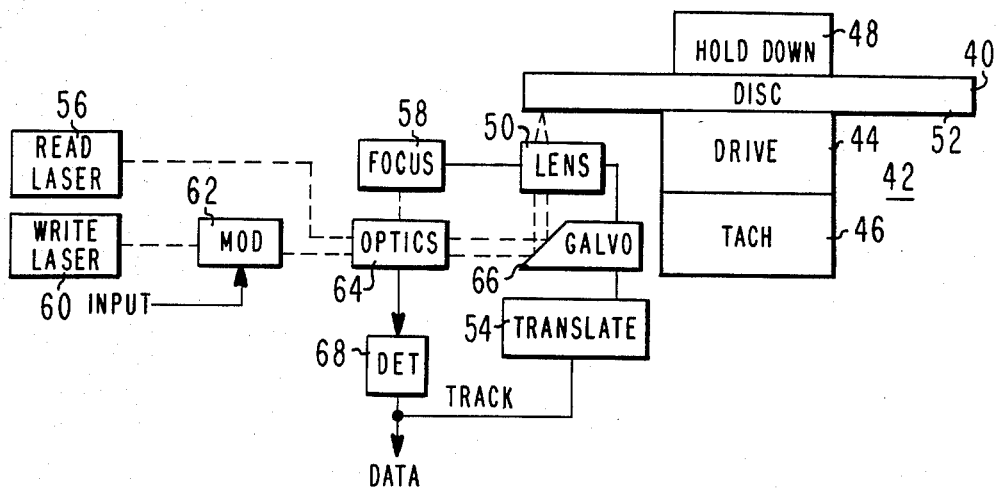
FIG. 2 illustrates, via a block diagram representation, a functional description of the drive assembly for one of the read/write stations of the apparatus of FIG. 1.

The read/write modules 8,10 provide the functions of record, read and data verification. Referring to FIG. 2, a functional diagram for a read/write module is shown. In operation, disc 40 (the cartridge is not shown in this functional arrangement) is placed on turntable 42 which includes drive 44, tachometer 46 and hold down 48. Disc 40 is held in place by activating hold down mechanism 48. After disc 40 is clamped in place, disc drive 44 is activated to rotate disc 40 at a predetermined angular speed, as measured by tachometer 46. Before a record or read operation can proceed, however, focus lens 50 must be positioned under the desired portion of the disc and arranged such that the light beams are focused onto surface 52 of disc 40. Lens 50 is positioned with respect to disc 40 by a motor driven translation stage 54.

When lens 50 is properly positioned with respect to the disc surface, read laser 56 is turned on so that a proper focus setting may be obtained. Focus is achieved by a servo-loop (not shown) which operates from the light from the read laser reflected from disc surface 52. A lens positioner 58 maintains the focus distance from disc surface 52 during both record and read operations.

After focus has been achieved, the desired operation may be initiated. In the record mode write laser 60 is activated. Data is clocked into modulator 62 which modulates the light that impinges on the disc surface from laser 60. The modulated record beam is directed to disc 40 via optics 64 and galvanometer controlled mirror 66. The modulated record beam is focused on disc surface 52 to form a series of pits of varying duration and spacing as the disc rotates. The resultant track that is formed contains the recorded information. When the information is to be recorded in concentric tracks, recording in a second track requires inactivating the record laser for a short time while lens 50 is repositioned to a point on disc 40 where the next track is to be recorded. This repositioning takes place very quickly (for example, less than 1 millisecond) and may be accomplished by moving the galvanometer 66 via translation stage 54. The translation stage 54 moves in increments (for example, four track spacings) and intermediate positions may be obtained by commanding the galvanometer 66 to tilt slightly. After repositioning takes place, write laser 60 is reactivated and a second track of data is fed into modulator 62 for recording. This sequence will repeat for as long as data is available for recording. To insure that the desired track may be found during read, a unique address is recorded with each track. It should be noted that the information may be recorded in a spiral format on the disc surface by moving translation stage 54 at a constant rate across the surface of the disc.

In the read mode the write laser is turned off. When lens 50 is positioned and focus is achieved the track servo is activated causing the read beam to lock onto the track nearest the center of the optical field of view. The track servo uses the galvanometer 66 for steering the beam in response to the detected signal from detector 68. The difference between the track being followed and the desired track is used to reposition the galvanometer and translation stage to the location of the desired track. When the proper track is being read, the data may be outputed from detector 68 to suitable processing circuitry (not shown).

Data verification during recording may be achieved by reading the information just after it has been recorded. The position of the focus read laser spot is adjusted so that it illuminates the pits being recorded just after recording takes place. Thus, the output data from the record/read module during a record operation may be compared to that which was input. If the number of errors encountered in the read process are below the requirements of the system no correction is made. When errors are detected, the data may be rerecorded and again verified for accuracy.

The focus actuator 58 in a read/write module imposes relatively large reaction forces on the translation stage 54 upon which it is mounted. The compliance of the translation stage produces, in turn, linear and rotary vibration that detracts from tracking and focus performance. For additional information with respect to the operation of a tracking system of an optical record/playback system reference may be made to U.S. Pat. No. 4,160,270 issued to A. M. Goldschmidt et al.

Figure 3:
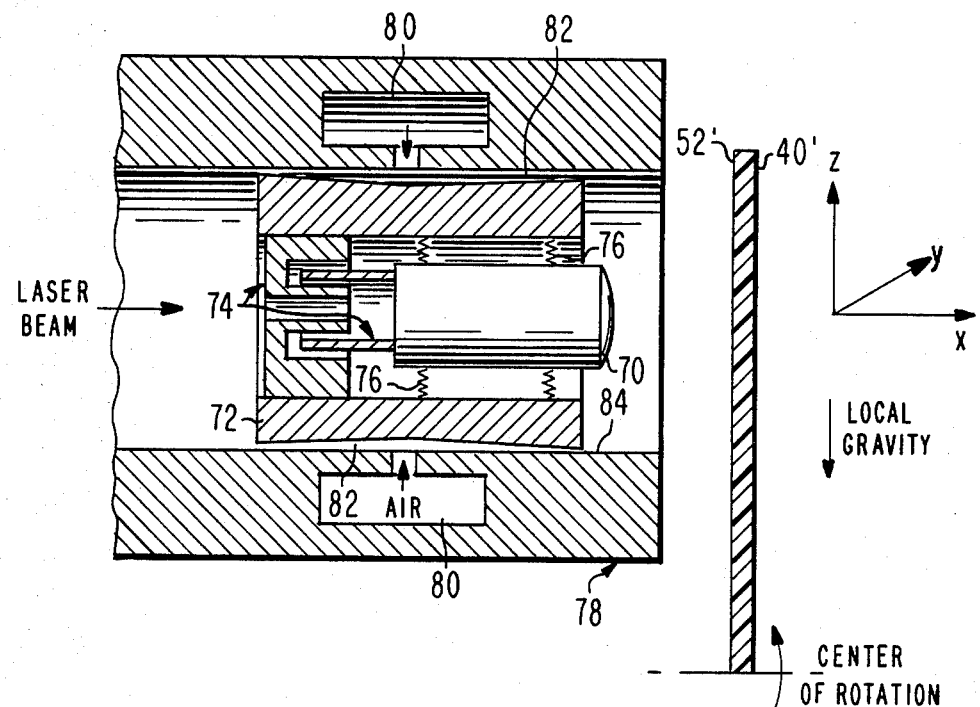
FIG. 3 illustrates a forcus lens and transducer for use in the apparatus of FIG. 1 embodying the principles of the present invention.

Referring to FIG. 3, a focus actuator device is shown for reducing the vibration that detracts from tracking and focus performance. The actuator maintains an objective lens 70 at a predetermined distance from the active surface 52' of a rotating recording disc 40' (the disc cartridge is not shown). In dynamically maintaining the predetermined distance as the recording surface 52' of disc 40' varies in the "x" direction due to disc warp and surface imperfections, lens 70 moves back and forth in the "x" direction. In accordance with the present invention, the reaction force effected by the moving lens moves a momentum compensating mass 72. The momentum compensating mass 72 comprises a linear motor 74 and springs 76. Motor 74 is driven from an electrical source (not shown) to cause relative movement between mass 72 and lens 70 to maintain focus. When lens 70 is moved in one direction, the momentum compensating mass 72 moves in an opposite direction, thereby minimizing the reaction force that is transmitted to the main body 78. Main body 78 supports the air galvanometer mirror for deflecting the optical beam in the y-z plane for tracking. Main body 78 is supported on the translational stage. Momentum compensating mass 72 reduces the inertial forces (vibrations) imposed on the galvanometer controlled mirror and the translational stage by comparison with systems in which the focus actuator is tied directly to the main body 78.

Figure 4A:
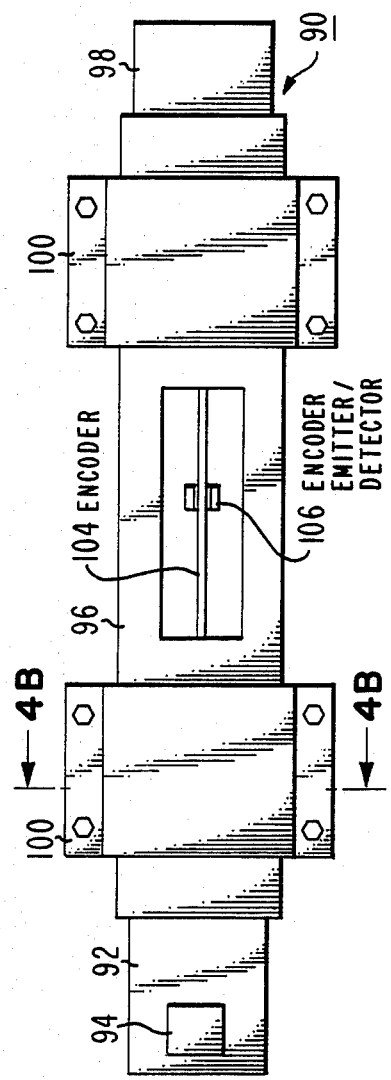
FIGS. 4a, 4b and 4c illustrate a translation stage of FIG. 1 embodying the principles of the present invention.
Figure 4C:
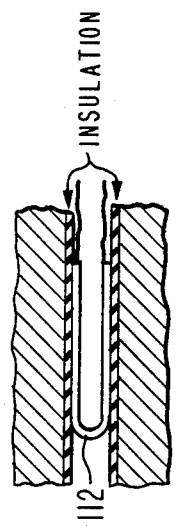
Figure 4B:
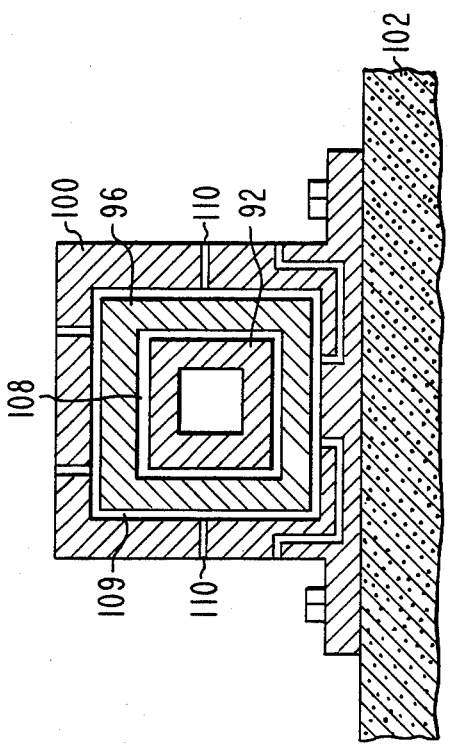

The weight of the momentum compensating mass 72 and the objective lens 70 are countered by a thrust air bearing 82, the air being supplied from ports 80. The momentum compensating mass 72 is suspended by the air bearing 82. The outside surface of the momentum compensating mass 72 is shaped to have a waist section approximately in the center thereof. The waist section in the center of the momentum compensating mass 72 is spaced farther from the internal bore 84 of main body 78 than the end regions thereof. The shape of the external surface of the momentum compensating mass in combination with the air supplied from ports 80 provide a small restoring force in the "x" direction, which on the average, keeps the focus assembly at a nominal position. The cross section of momentum compensating mass 72 in the "x" direction may be formed as a square or rectangle to prevent rotation about the optical axis. Springs 76 are designed such that when a force is applied via motor 74 lens 70 moves in the "x" direction only.

Where several optical heads are independently controlled in time and space, motion of the translation stage of one head may disturb the reading or writing operation on a second head. Referring to FIGS. 4a, 4b and 4c a translational stage is shown which reduces or eliminates problems associated with vibration transmitted by another translation stage. The translation stage of the present invention includes two moving members, the controlled moving element 92 which supports the optical head 94 and a momentum compensating member 96. A linear motor 98 effects a linear motion of controlled moving element 92. Linear motor 98 produces linear motion which is controllable in both magnitude and sign. Member 96 is a recoil member which is designed to be much heavier than member 92. When motor 98 produces a large step force, controlled moving element 92 moves at high velocity toward its newly commanded position. Simultaneously, momentum compensated member 96 moves in an opposite direction with a smaller velocity, inversely proportional to the respective masses. The net result of the motion coupled with the counter motion is that no force (vibration) is transmitted to frame members 100 or mounting base 102. The motor thrust vector is aligned with the center of mass of members 92 and 96 thus minimizing pitch and yaw moments about the mounting base 102.

One method of establishing the radial positioning of controlled moving element 92 relative to the disc is by using a linear incremental encoder 104. The linear incremental encoder 104 enables control of displacement via a servo loop coupled to linear motor 98. Linear incremental encoder 104 provides information concerning the displacement of the controlled moving element 92 with respect to the frame member 100 and therefore with respect to the disc. The encoder includes an emitter/detector combination 106 for providing position information.

Linear motor 98 may be a brushless DC motor, an induction motor or a voice coil linear actuating device. A brushless DC motor may have sine-cosine commutation signals derived from a linear commutation device (not shown) located between elements 92 and 96. Air bearings 108 and 109 are provided to separate the controlled moving element 92 from the momentum compensating member 96 and the momentum compensating member 96 from frame members 100 respectively. Air may be supplied by tubes 110 or through a slotted area (not shown) from member 100. The ports to supply air between elements 92 and 96 are not shown in interest of clarity. The separation of the momentum compensating member 96 and the frame member 100 may be made by roller or ball bearings instead of an air bearing.

Referring to FIG. 4c, the motor current may be carried by U-shaped metallic bands 112 positioned between the various members 92, 96 and 100. The metal band 112 presents a small resistance to movement, primarily only the mechanical hysterisis of the band material. Illustratively, the controlled moving element 92 has a typical range of movement of 4 inches and the momentum compensating member 96 has a typical range of one inch in the recoil mode.

Figure 5:
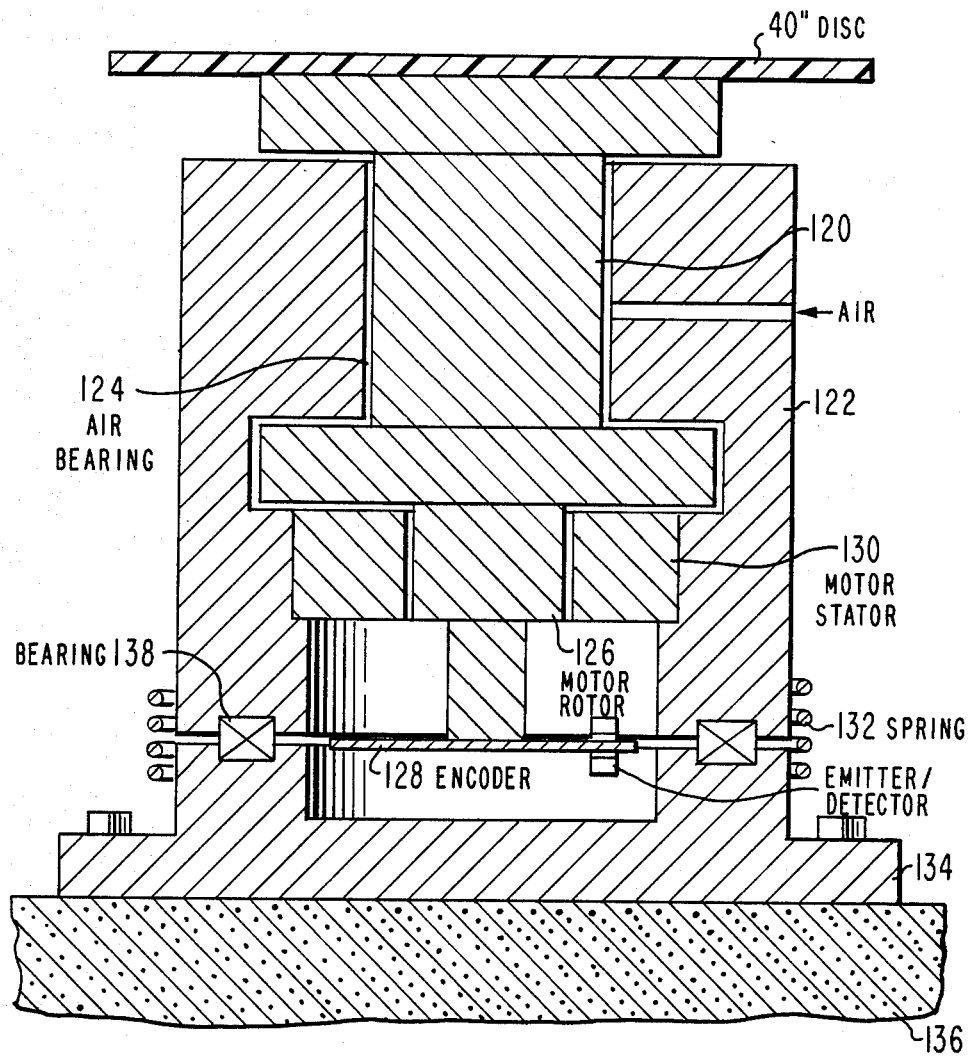
FIG. 5 shows a cross-sectional view of a turntable of FIG. 1 embodying the principles of the present invention.

In optical disc systems of a type described with reference to FIG. 1 requiring multiple turntables operating independently, fast spinup requirements may impose large reaction torque on the common frame thus effecting vibration which interferes with reading or writing on another turntable. Referring to FIG. 5, a turntable system is shown for reducing vibrations transmitted to other elements in a read/write system. Disc 40" is rotated on a turntable during read/write operations (the disc cartridge is not shown). The rotating spindle 120 rotates on an air bearing 124 around a frame member 122. A rotor 126 for the drive motor and an encoder disc 128 are coupled to the spindle 120. Motor stator 130 is coupled to the frame member 122. The frame member 122 which provides the reaction portion (momentum compensating mass) of the system is free to rotate but constrained by helical spring 132 which is attached to frame member 134. Frame member 134 is, in turn, connected to the system frame 136.

In operation a pulse of motor torque will cause spindle 120 to rotate and frame member 122 to counter rotate. Spring 132 is provided to bias frame member 122 such that it returns to its original position after the initial torque has subsided. The advantage of the momentum compensation is that the large-amplitude, high-frequency spectrum of the motor torque pulse is effectively transformed to a smaller amplitude, lower frequency spectrum disturbance which is transmitted to the system frame 136.

In theory the reaction torque to the mounting frame 136 could by reduced to zero if frame member 122 was free to rotate and not restrained by spring 132. This presents, however, severe design and cost problems.

Ball bearings 138 are provided between frame member 122 and frame member 134. It should be noted that these bearings may be of another type, for example, an air or roller bearing.

A coiled air supply line may serve as the restraining spring 132. Encoder 128 may provide relative displacement between spindle 120 and frame member 134 although displacement between spindle 120 and frame member 122 may be more readily implemented and provide satisfactory system performance.

It should be noted that the arrangement of the various figures is not meant to limit the invention to the specific embodiments shown therein. For example, the orientation of the various components shown may be shifted with respect to local gravity.

Other embodiments of the invention will be apparent to those skilled in the art. For example, the movement to the compensating mass relative to the stationary frame may be aided by a second motor coupled between the stationary frame and the compensating mass, thereby reducing the effects of bearing friction and allowing use of inexpensive sleeve bearings rather than complex and expensive air or roller bearings, and thereby also aiding in overcoming the hysteresis effects of the electrical connections between the moving parts.

What is claimed is:

1. In a data processing system for use in recording or retrieving information, said information being recorded in tracks on a surface of a disc-shaped record medium, said system comprising support means for supporting said data processing system, transducer means for recording or retrieving said information in said tracks, motion establishing means for establishing relative motion between said transducer means and said record medium, and means for generating movement of said motion establishing means, said movement producing a counter movement, said counter movement tending to move said support means, an improvement for absorbing said counter movement from said support means, said improvement comprising:

a momentum compensation mass movably positioned intermediate said motion establishing means and said support means, said momentum compensation mass decoupling said motion establishing means from said support means, said momentum compensation mass reactively coupled to said motion establishing means for absorbing said counter movement produced by said movement of said motion establishing means;

said momentum compensation mass having weight greater than the weight of said motion establishing means;

said momentum compensation mass moving in reaction to movement of said motion establishing means, said momentum compensation mass moving in an opposite direction to, and with smaller velocity than, said motion establishing means.

2. The apparatus according to claim 1 wherein said motion establishing means is a turntable for effecting rotary relative motion between said record medium and said transducer means.

3. The apparatus according to claim 1 wherein said motion establishing means is a focus actuator for use in maintaining a beam of light in focus on said surface of said record medium.

4. The apparatus according to claim 1 wherein said motion establishing means is a linear transport for effecting linear relative motion between said record medium and said transducer means.

5. In a data processing system for use in recording and retrieving information, said information being recorded on the surface of a disc-shaped record medium, said system comprising support means for supporting said data processing system, first and second transducer means for recording or retrieving said information on first and second record media, respectively, first and second motion establishing means for establishing relative motion between said first and second transducer means and said first and second record media, respectively, and means for generating movement of one of said motion establishing means, wherein changes of movement effected by said one of said motion establishing means between respective ones of said transducer means and said record media effect reaction forces which may be transmitted through said support means and interfere with record or retrieve operations being performed during said changes of movement, an improvement for absorbing said reaction forces, said improvement comprising:

a momentum compensation mass movably positioned intermediate said one of said motion establishing means and said support means, said momentum compensation mass decoupling said one motion establishing means from said support means, said momentum compensation mass reactively coupled to said one motion establishing means for absorbing said reaction forces effected by said changes of movement;

said momentum compensation mass having weight greater than the weight of said one of said motion establishing means;

said momentum compensation mass moving in reaction to movement of said one of said motion establishing means, said momentum compensation mass moving in an opposite direction to, and with smaller velocity than, said one of said motion establishing means.

6. The apparatus according to claim 5 wherein said first and second motion establishing means are turntables for effecting rotary relative motion between said first and second transducer means and said first and second record media respectively.

7. The apparatus according to claim 5 wherein said first and second motion establishing means are focus actuators for use in maintaining first and second beams of light focused on information surfaces of said first and second record media respectively.

8. The apparatus according to claim 5 wherein said first and second motion establishing means are linear transports for effecting linear relative motion between said first and second record media and said first and second transducer means respectively.

9. In an optical disc system for use in recording and retrieving information, said information being recorded in a track on a surface of a disc-shaped record medium, said system comprising support means for supporting said data processing system, a light source for providing a beam of light, focusing means for focusing said beam of light onto a surface of a first record medium, tracking means for affecting said focused light beam such that said focused light beam follows a track on said surface of said first record medium, transducer means for recording or retrieving information on a surface of a second record medium, motion establishing means for establishing relative motion between said transducer means and said second record medium, and means for generating movement of said motion establishing means, said movement producing a counter movement, said counter movement tending to move said support means, wherein movement of said support means adversely affects said focusing means or said tracking means such that information being recorded or retrieved from said surface of said first record medium is distorted, an improvement for absorbing said counter movement from said support means, said improvement comprising:

a momentum compensation mass movably positioned intermediate said motion establishing means and said support means, said momentum compensation mass decoupling said motion establishing means from said support means, said momentum compensation mass reactively coupled to said motion establishing means for absorbing said counter movement produced by said movement of said motion establishing means such that said focusing means and said tracking means maintain said light beam in operating relation with said first record medium;

said momentum compensation mass having weight greater than the weight of said motion establishing means;

said momentum compensation mass moving in reaction to movement of said motion establishing means, said momentum compensation mass moving in an opposite direction to, and with smaller velocity than, said motion establishing means.

10. The apparatus according to claim 9 wherein said motion establishing means includes a turntable for effecting rotary relative motion between said second record medium and said transducer means.

11. The apparatus according to claim 9 wherein said motion establishing means includes a focus actuator for use in maintaining a beam of light focused on said surface of said second record medium.

12. The apparatus according to claim 9 wherein said motion establishing means includes a linear transport for effecting linear relative motion between said second record medium and said transducer means.

* * * * *